United States Patent [19]

Mine et al.

[11] 4,082,726

[45] Apr. 4, 1978

[54] CURABLE ORGANOPOLYSILOXANE COMPOSITIONS WITH IMPROVED ADHESION

[75] Inventors: Katsutoshi Mine; Masuo Yokoyama, both of Ichihara, Japan

[73] Assignee: Toray Silicone Company, Ltd., Tokyo, Japan

[21] Appl. No.: 715,363

[22] Filed: Aug. 18, 1976

[30] Foreign Application Priority Data

Aug. 19, 1975   Japan ................................. 50-99768

[51] Int. Cl.$^2$ .............................................. C08G 77/04
[52] U.S. Cl. ....................... 260/46.5 UA; 260/46.5 Y; 260/46.5 G; 260/348.41; 428/447
[58] Field of Search ..................... 260/46.5 Y, 348 SC, 260/46.5 UA, 46.5 G, 825, 348.41

[56] References Cited

U.S. PATENT DOCUMENTS

| 3,324,080 | 6/1967 | Hicks ............................... 260/46.5 Y |
| 3,527,655 | 9/1970 | Ballard .......................... 260/46.5 UA |
| 3,555,051 | 1/1971 | Marsden et al. ................. 260/46.5 Y |

*Primary Examiner*—Melvyn I. Marquis
*Attorney, Agent, or Firm*—Robert L. McKellar

[57] ABSTRACT

This invention relates to curable organopolysiloxane compositions which have self-adhering properties. The self-adhering properties eliminate the need of priming substrates with adhesives or coupling agents. These compositions give better adhesion to substrates than the same organopolysiloxane without the adhesive component but which are adhered using primers.

10 Claims, No Drawings

CURABLE ORGANOPOLYSILOXANE COMPOSITIONS WITH IMPROVED ADHESION

HISTORY AND BACKGROUND

There are many organopolysiloxane compositions which are readily curable to give elastomeric rubbers. There are also many cure systems for such organopolysiloxane compositions and lengthy discussions on such systems are not required because they are well known to those skilled in the art.

Examples of some of the better-known techniques are for instance exposing an acyloxy end-blocked polydimethylsiloxane to moisture or contacting a hydroxy end-blocked, linear polydimethylsiloxane with ethylpolysilicate or alkyltrialkoxysilanes as crosslinking agents. Cures are also effected by heating polysiloxanes, containing unsaturated organic groups, in the presence of peroxides. Also, cured rubbers are obtained by contacting polysiloxanes containing unsaturated organic groups with polysiloxanes containing silicon bonded hydrogen, in the presence of platinum or rhodium as catalysts.

The present invention deals, in part, with the latter cure system.

One of the things that all of these cure systems have in common is their inability to adhere properly on the substrates they are being used on.

In this regard, the acyloxysiloxanes, or the use of acyloxysilanes as crosslinkers sometimes enhances the self-adhering properties of such curable organopolysiloxane systems but they too have problems on certain substrates.

Of all of the cure systems noted above, the one which requires the most assistance in bonding to various substrates is the system which cures through addition of silicon bonded hydrogen to unsaturated organic groups on silicon. This problem is especially apparent when such systems are used on silicones as the substrate, that is, when curing silicone elastomeric materials on silicone substrates.

On the other hand, those skilled in the art desire very much to use the silicon bonded hydrogen addition to unsaturated organic groups on silicon cure system because it has many desirable features such as rapid cure, no or essentially no, by-products of the cure reaction, less toxicity than the other cure systems, greater shelf stability, etc.

Further, there are not the disadvantages associated with self-adhering materials that there are with those systems which have to be primed.

For example, the use of a primer to adhere elastomers to substrates requires an additional preparatory step wherein the substrate must be treated with the primer before the curable material is put in place.

Aside from the obvious disadvantage of having an extra step in the placement and use of such curable elastomers, the general use of primers per se has some disadvantages such as the time lapse required for the primer to dry and partially react on the substrate before the elastomer is applied; the inability to cover the entire surface of irregularly shaped or intricately shaped substrates and, the inability of the primer itself to give uniform and sufficient adhesion to the elastomer.

Self-adhering organopolysiloxane compositions which utilize the silicon bonded hydrogen addition to silicon bonded unsaturated organic groups as the cure system have been attempted.

In U.S. Pat. No. 3,527,655, self adhering organopolysiloxanes were prepared, by adding to the curable organopolysiloxane, a separate organopolysiloxane which was a cohydrolyzate of vinyl trichlorosilane and vinyl triethoxysilane.

The disadvantages of such a self-adhering system, however, were the inability of the material to adhere to variable substrates and it's inability to adhere to most plastics.

It is therefore an object of this invention to produce organopolysiloxane compositions, which are curable through the silicon bonded hydrogen addition to unsaturated organic groups on silicon, which have enhanced adhesion to various substrates.

It is a further object of this invention to produce organopolysiloxane compositions, which are curable through the addition of silicon bonded hydrogen to unsaturated organic groups on silicon, which have especially good adhesion to silicone substrates.

DISCUSSION OF THE INVENTION

The above objects are obtained by utilizing the compositions of this invention.

The invention relates to a curable organopolysiloxane composition having good adhesive properties.

More specifically, this invention relates to curable organopolysiloxane compositions having improved adhesion and which are cured by the addition of silicon bonded hydrogen to silicon bonded, unsaturated organic groups under the influence of platinum or rhodium as a catalyst.

Such compositions consist essentially of (A) an organopolysiloxane containing at least two lower alkenyl groups bonded to silicon atoms which are in the same molecule, (B) an organopolysiloxane containing at least two hydrogen atoms bonded to silicon atoms which are in the same molecule, wherein the total number of lower alkenyl groups and hydrogen atoms bonded to silicon in the mixture is at least 5, (C) a catalyst, the improvement comprising, adding to the components (A), (B) and (C), a fourth component (D) an organosilicon compound having at least one $Q(R''O)_2Si-$ group and at least one lower alkenyl group or hydrogen atom bonded to silicon atoms which are in the same molecule, wherein Q is a monovalent hydrocarbon radical containing at least one epoxy group and $R''$ is a lower alkyl group.

The organopolysiloxane composition (A) which has at least two lower alkenyl groups bonded to the silicon atoms can be represented by the general formula $$(R_a SiO_{\frac{4-a}{2}})_n$$

wherein $n$ is an integer greater than 4, $a$ is 1–3, at least two R's are lower alkenyl groups, the remainder of R's being hydroxy or substituted or unsubstituted monovalent hydrocarbon groups which do not contain unsaturated fatty acid groups.

The organopolysiloxane (A) may be linear or branched. It may also contain besides linear siloxane units and branched siloxane units, units such as $R_3SiO_{1/2}$, $RSiO_{3/2}$ or $SiO_{4/2}$ where R is as defined above. The organopolysiloxane (A) may be a homopolymer or a copolymer and the total degree of polymerization of the organopolysiloxane (A) may be from 1,000 to 10,000.

The lower alkenyl group can be, for example, a vinyl group, allyl, 1-propenyl, isopropenyl and the preferred group is vinyl.

It is required that there be present at least two lower alkenyl groups in each molecule of (A). The position of such lower alkenyl groups on the silicone molecule is not critical but it is preferred that the lower alkenyl groups be separated as far as possible on the molecule.

The monovalent unsubstituted hydrocarbon R can be, for example, a methyl group, ethyl, n-propyl, octyl, cyclohexyl or phenyl. Methyl and phenyl are preferred.

The monovalent substituted hydrocarbon groups can be, for example, a tolyl group, xylyl, benzyl, p-chlorophenyl or cyanoethyl.

The organopolysiloxane (B) which has at least two hydrogen atoms bonded to silicon atoms in the same molecule can be represented by the general formula $$(R'_b SiO_{\frac{4-b}{2}})_m$$

wherein $m$ is an integer greater than 2, $b$ is 1 to 3, $R'$ is a hydrogen atom and there are at least two present in the molecule. $R'$ can also be a hydroxyl group or a substituted or unsubstituted monovalent hydrocarbon radical which does not contain an unsaturated fatty acid group.

The organopolysiloxane (B) may be linear, cyclic or branched. It may also contain besides linear and branched siloxane units, siloxane units such as $R_3SiO_{1/2}$, $RSiO_{3/2}$ or $SiO_{4/2}$, where R is as defined above.

The siloxane (B) may be a homopolymer or a copolymer and the total degree of polymerization of (B) is from 500 to 2,000.

The monovalent unsubstituted hydrocarbon groups in (B) can be, for example, methyl, ethyl, n-propyl, octyl, cyclohexyl and phenyl.

The monovalent substituted hydrocarbon group in (B) can be, for example, tolyl, xylyl, benzyl, p-chlorophenyl or cyanoethyl.

$R'$, with the exception of the hydrogen atoms present, is preferably methyl.

In order that the composition of the present invention can cure correctly, the presence of at least 5 groups in total of lower alkenyl and hydrogen must be present in the combination of components (A) and (B), that is, if there is present an organopolysiloxane (A) which contains an average of 2 lower alkenyl groups per molecule, then there must be present component (B) wherein there are at least 3 silicon bonded hydrogen atoms per molecule of (B).

It is also required that the ratio of silicon bonded lower alkenyl groups to silicon bonded hydrogen atoms is from 0.5 to 1 to 1.5 to 1 in the combination of components (A) and (B).

The component (C), the catalyst, can be any catalyst that is effective for the addition of the silicon bonded hydrogen to the silicon bonded lower alkenyl group.

Such catalysts can be, for example, finely divided elemental platinum, finely divided platinum on carbon black, chloroplatinic acid, coordination complexes of chloroplatinic acid and olefins, coordination complexes of chloroplatinic acid and vinylsiloxanes, tetrakis(triphenylphosphine)palladium, mixtures of palladium black and the triphenylphosphine and rhodium.

The amount of catalyst is not critical but it is preferred to use 0.1 to 20 parts per million parts of the total amount of components (A) and (B).

The organosilicon component (D) having at least one group with the formula $$Q(R''O)_2Si$$

is the key component of the curable organopolysiloxane.

This component must have at least one lower alkenyl group or at least one hydrogen atom bonded to silicon atoms in the molecule.

Q is a monovalent hydrocarbon group which contains at least one epoxy group and $R''$ is a monovalent substituted or unsubstituted hydrocarbon group as set forth for $R'$ above.

Q has the general formula $$H_2C\underset{\diagdown O \diagup}{\text{———}}CHR'''—$$

wherein $R'''$ is any divalent organic radical.

$R'''$ can be, for example, methylene, ethylene, propylene or phenylene.

The organic radical can be, for example, chloroethylene, fluoroethylene, $-CH_2OCH_2CH_2CH_2-$, $-CH_2CH_2OCH_2CH_2-$, $$-CH_2CH_2OCHCH_2-,$$
$$\qquad\qquad\quad |$$
$$\qquad\qquad\quad CH_3$$

$-CH_2OCH_2CH_2OCH_2CH_2-$, and $-CH_2CHCH_2-$.
$\qquad\qquad\qquad\qquad\qquad\qquad\qquad\qquad\qquad\quad |$
$\qquad\qquad\qquad\qquad\qquad\qquad\qquad\qquad\qquad\; OH$ Examples of Q are, for example, β-(3,4-epoxychlorohexyl)ethyl and gamma-(3,4-epoxychlorohexyl)propyl.

$R'''$ can be, for example, methyl, ethyl, n-propyl and isopropyl, preferably, methyl.

The lower alkenyl group present in Q can be, for example, vinyl, allyl, 1-propenyl and isopropenyl.

Specific examples of (D) include $$H_2C\underset{\diagdown O \diagup}{\text{———}}CHCH_2CH_2\underset{\underset{\underset{CH_3}{|}}{\overset{\overset{CH_3}{|}}{|}}{Si}}{}-O-\underset{\underset{Vi}{|}}{\overset{\overset{CH_3}{|}}{Si}}OH$$

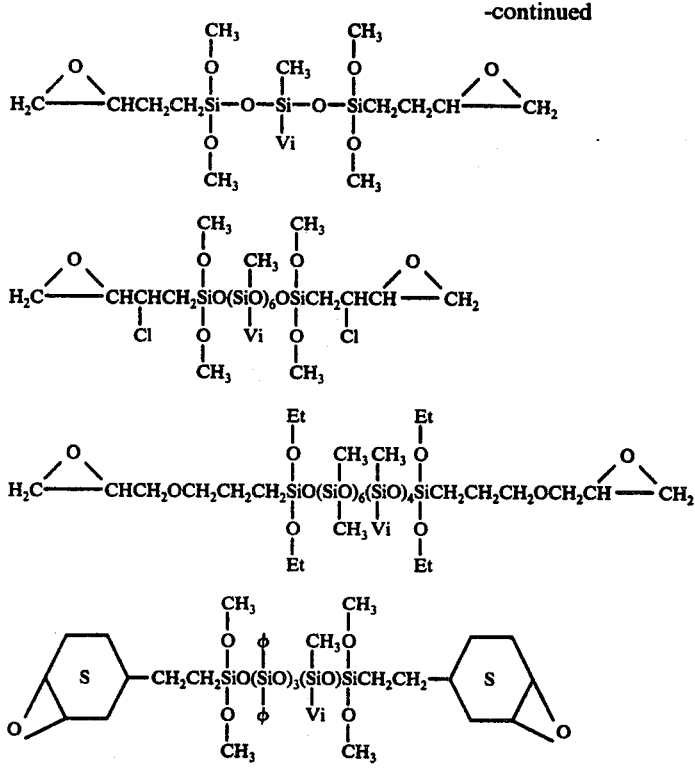
A copolymer resin which has 52.2 mol% of MeSiO$_{1.5}$ units, 5 mol% of ViSiO$_{1.5}$ units, 40 mol% of Me$\phi$SiO units and 2.5 mol% of
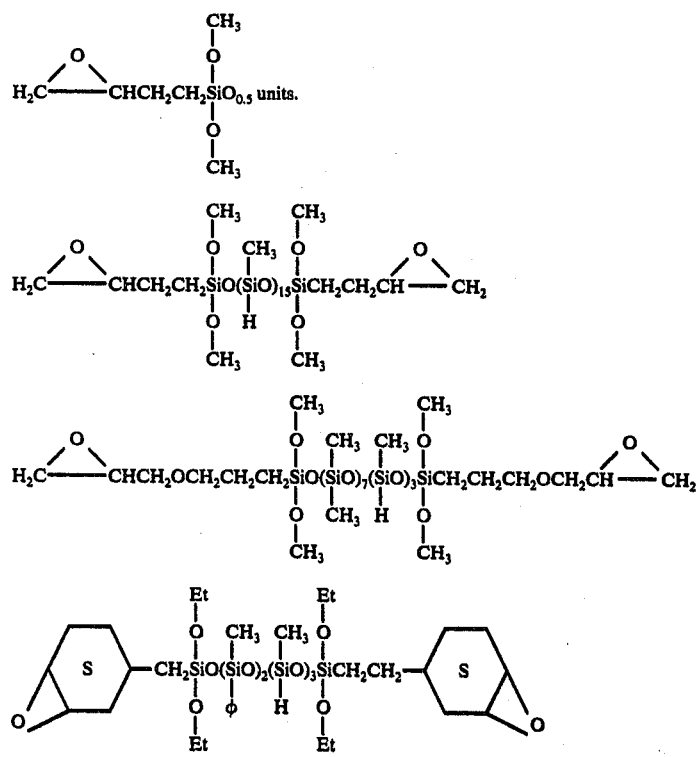
A copolymer resin which has 50 mol% of MeSiO$_{1.5}$ units, 40 mol% of Me$\phi$SiO units, 4.7 mol% of MeHSiO units, 2.3 mol% of Me$_2$SiO$_{0.5}$ units and 3.0 mol% of

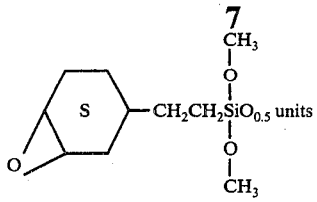

wherein CH$_3$ denotes a methyl group, Et denotes an ethyl group, Vi denotes a vinyl group, $\phi$ denotes a phenyl group.

Component (D) is used within the range of 0.05 to 5 weight percent based on the total weight of components (A) and (B).

If less than 0.05 percent is used, the adhesive property is not enhanced.

If the quantity exceeds 5 weight percent the adhesiveness is equivalent to that falling within the use of 0.05 to 5 percent and the only consideration is cost.

The curable organopolysiloxane composition is prepared by mixing all four ingredients (A), (B), (C) and (D).

If all four ingredients are mixed together, the cure reaction initiates at room temperature and therefore it is preferred not to so mix the 4 ingredients all at the same time unless the curable organopolysiloxane is to be used right away.

In order to avoid premature curing, the components (A), (B), (C) and (D) can be separated into two mixtures which are then mixed together just before use.

Such separated mixtures can be, for example, a first mixture of components (A) and (C) and a second mixture of components (B) and (D). The first and second mixtures are then further mixed to get the curable organopolysiloxane.

The curable organopolysiloxane can cure to a gel, an elastomer or to a very solid rubber depending upon the types, and ratios in the mixture, of the ingredients.

The curable organopolysiloxane may be cured at room temperature or the cure rate can be accelerated by heating. It is advantageous, for example, to heat the curable material to 50°-150° C or higher.

The cured organopolysiloxane adheres very strongly to metal, glass, ceramics, stones, concrete, wood, paper, fibers, plastics, rubbers, etc.

The curable organopolysiloxane even has good adhesion while it is curing to its final state.

Other additives and aids can be added to the curable organopolysiloxane without deleterious effects on the cured materials.

Such additives and aids can be, for example, fumed silica, precipitated silica, hydrophobic fumed silica, hydrophobic precipitated silica, finely divided quartz, diatomaceous earth, talc, aluminum silicate, zirconium silicate, alumina, calcium carbonate, zinc oxide, titanium dioxide, ferric oxide, glass fibers, asbestos, glass beads; organic solvents such as xylene, toluene and trichloroethylene; benzotriazole, 2-ethynylisopropanol, dimethyl sulfoxide as the inhibitor for the addition reaction catalyst; manganese carbonate, carbon black as flame retardant additives and heat stabilizers; oil stabilizers, pigment, etc.

It is within the scope of this patent to use organopolysiloxanes and organosilanes as additional additives over and above the components (A), (B) and (D) for such things as extenders etc.

The curable organopolysiloxanes of this invention are very useful as adhesives for metal, glass, ceramics, stone, concrete, wood, paper, fibers, plastics and rubber and as a sealant, coating material, encapsulant, potting compound and impregnating agent.

The following examples are shown to better clarify the invention and are not intended to limit the scope of the patent as set forth in the claims.

Viscosities were all measured at 25° C. unless specified otherwise.

In the examples, Me is methyl; Et is ethyl; Vi is vinyl and $\phi$ is phenyl.

EXAMPLE 1

97 parts of dimethylpolysiloxane, blocked at both ends with dimethylvinylsilyl groups, having a viscosity of 2,000 cs., 2 parts of methylhydrogenpolysiloxane, blocked at both ends with trimethyl silyl groups, having a viscosity of 10 cs., 0.6 part of the compound represented by the following formula (1)

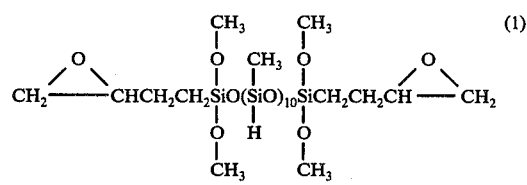

and 10 parts of platinum per million parts of the total amount of the aforementioned polysiloxanes were added in the form of an ethanol solution of chloroplatinic acid and were vigorously mixed. The mixture thus mixed was poured between a pure aluminum plate and a glass plate, and this composite was then placed in an oven and was cured by heating at 150° C. for 30 minutes. After this was cooled to room temperature, these two sheets of plates were separated with the result that the silicone elastomer layer was broken, so-called cohesive failure had taken place. As a comparison example, when the similar adhesion test was conducted under the same conditions on the mixture to which only the compound represented by the above formula (1) was not added, the silicone elastomer layer was mainly separated from the aluminum plate, so-called adhesive failure had taken place.

EXAMPLE 2

40 parts of fumed silica subjected to a hydrophobic treatment with trimethylsilyl groups on the surface thereof (specific surface area thereof is 200 m$^2$/g) was added to 95 parts of a copolymer of dimethylsiloxane and methylvinylsiloxane blocked at both ends with hydroxyl groups and having a viscosity of 4,000,000 cs. (mol ratio of dimethylsiloxane units to methylvinylsiloxane units was 96:4) and 5 parts of a copolymer of dimethylsiloxane and methylhydrogensiloxane blocked at both ends with trimethylsilyl groups and having a viscosity of 100 cs. (mol ratio of dimethylsiloxane units to methylhydrogensiloxane units was 50:50), and the mixture thus formed was vigorously mixed to become uniform.

Then, 0.6 part of the compound represented by the following formula (2)

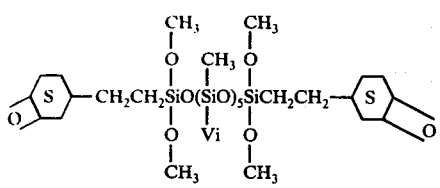

and 10 parts of platinum per million parts of the total amount of the aforementioned polysiloxanes in the form of 2-ethyl-hexanol solution of chloroplatinic acid were added and were vigorously mixed. This mixture was made into sheets by two rolls, and was interleaved between a stainless steel and polyester film, and was lightly pressed, and was cured by heating at 120° C. for 60 minutes. When this composite was cooled to room temperature, one end of the polyester film was bent in a 180° reverse direction and was drawn, the polyester film was broken before the silicone elastomer layer was broken.

As a comparison example, when the mixture to which only the compound represented by the above formula (2) was not added was prepared and was then subjected to an adhesion test under the same conditions, the silicone elastomer layer was separated from both the polyester film surface and the stainless steel surface, so-called adhesive failure had taken place.

EXAMPLE 3

65 parts of a copolymer of dimethylsiloxane and methylphenylsiloxane blocked at both ends with methylphenylvinylsilyl groups and having a viscosity of 9,000 cs. (mol ratio of dimethylsiloxane units to methylphenylsiloxane units was 90:10) and 35 parts of a copolymer of $SiO_2$ units, $Me_3SiO_{0.5}$ units and $Me_2ViSiO_{0.5}$ units (containing 2.5% of vinyl group) were mixed. 4 parts of $Si(OSiMe_2H)_4$ and 1.1 part of the compound represented by the following formula (3)

EXAMPLE 4

An organopolysiloxane resin having a viscosity of 12,570 cs. which has 20 mol% of MeViSiO units and $\phi SiO_{1.5}$ units, $MeSiO_{1.5}$ units, MeSiO units and $Me_3SiO_{0.5}$ units where the ratio of phenyl to silicon is 0.4 and an organohydrogen-polysiloxane having a viscosity of 250 cs. which has 10 mol% of $Me_2SiO_{0.5}$ units, 40 mol% of $\phi SiO$ units and 50 mol% of MeHSiO units were compounded in such a manner that mol ratio of a vinyl group bonded to a silicon atom to a hydrogen atom bonded to a silicon atom was 1:1.

0.5 part of the compound represented by the following formula (4)

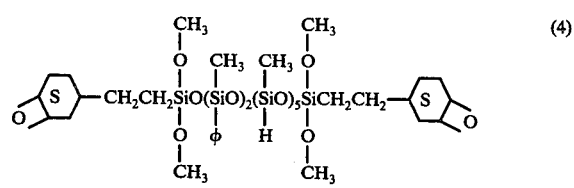

and 10 parts of platinum per million parts of the total amount of the aforementioned organopolysiloxanes in the form of ethanol solution of chloroplatinic acid to 100 parts of the mixture thus mixed. This mixture was at once poured into a box made of NORYL ® resin (modified polyphenylene oxide resin made by General Electric Co.), and was cured by heating at 100° C. for 1 hour. Even if the box was placed upside down and hit from on top, the cured silicone resin did not come out from the box due to tight adhesion to the box.

As a comparison example, when the mixture to which only the compound represented by the above formula (4) was not added, was subjected to an adhesion testing under the same conditions, the cured silicone resin easily came out from the NORYL ® resin box.

That which is claimed is:

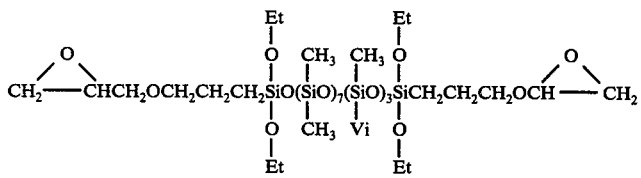

and 20 parts of platinum per million parts of the total amount of both the aforementioned copolymers in the form of platinum powder dispersed on carbon powder were added to 94.9 part of the mixture thus formed and were vigorously mixed and poured between a polyimide film and a copper plate. This composite was placed in an oven, and was cured by heating at 200° C. for 20 minutes. When the composite thus prepared was cooled to room temperature, one end of the polyimide film was bent in a 180° reverse direction and was drawn. The polyimide film was broken before the silicone elastomer layer was broken.

As a comparison example, when the mixture to which only the compound represented by the formula (3) was not added, was subjected to an adhesion test under the same conditions, the silicone elastomer layer was then separated from the polyimide surface. So-called adhesive failure had taken place.

1. A curable organopolysiloxane composition consisting essentially of a mixture of
   A. an organopolysiloxane containing at least two lower alkenyl groups bonded to silicon atoms which are in the same molecule,
   B. an organopolysiloxane containing at least two hydrogen atoms bonded to silicon atoms which are in the same molecule,
      wherein the total number of lower alkenyl groups and hydrogen atoms bonded to silicon in the mixture is at least 5,
   C. a catalyst,
      the improvement comprising, adding to the components (A), (B) and (C), a fourth component
   (D) an organosilicon compound having at least one Q(R″O)$_2$Si- group and at least one lower alkenyl group or hydrogen atom bonded to silicon atoms which are in the same molecule, wherein Q is a monovalent hydrocarbon radical containing at least one epoxy group and R" is a lower alkyl group.

2. A curable organopolysiloxane composition as claimed in claim 1 wherein
   A. is a dimethylvinylsilyl end-blocked polydimethylsiloxane;
   B. is a trimethylsilyl end-blocked methylhydrogenpolysiloxane;
   C. is chloroplatinic acid, and
   D. has the average formula

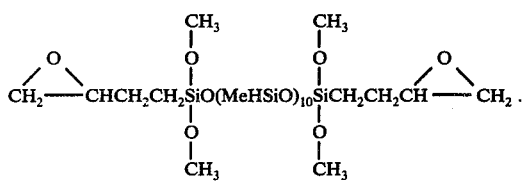

3. A curable organopolysiloxane composition as claimed in claim 2 wherein (A) and (B) are present in the ratio of 1.0 silicon bonded lower alkenyl groups in (A) to 1.0 silicon bonded hydrogen groups in (B), (C) is present as 10 parts per million platinum in the form of chloroplatinic acid in ethanol and (D) is present as 1.0 weight percent based on the total weight of components (A) and (B) and has the average formula

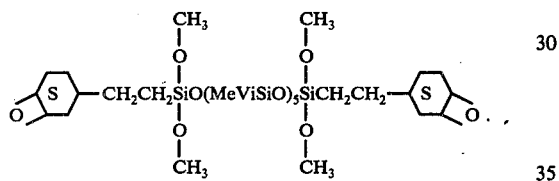

4. A curable organopolysiloxane as claimed in claim 3 wherein (D) has the average formula

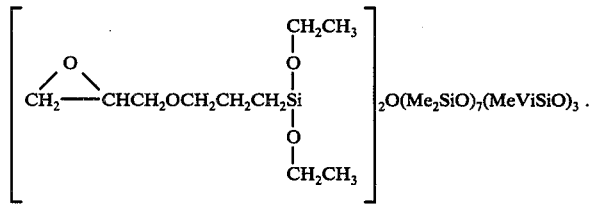

5. The cured composition of claim 1 having improved adhesion.

6. A composition of matter which has at least one Q(R"O)$_2$Si group wherein
   Q is a monovalent hydrocarbon group which contains at least one epoxy group,
   R" is a hydrogen atom or a substituted or unsubstituted monovalent hydrocarbon group which does not contain an unsaturated fatty acid group and said Q(R"O)$_2$Si group contains, in addition, at least one lower alkenyl group or at least one hydrogen atom bonded to silicon in the molecule.

7. A composition as claimed in claim 6 wherein Q is

R" is methyl and there is present in the molecule one lower alkenyl group bonded to a silicon atom.

8. A composition as claimed in claim 6 wherein Q is

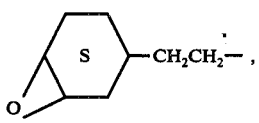

R" is methyl and there is present in the molecule one hydrogen atom bonded to a silicon atom.

9. A composition of matter which is

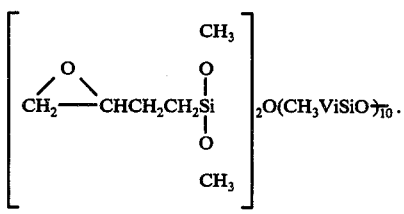

10. A composition of matter which is

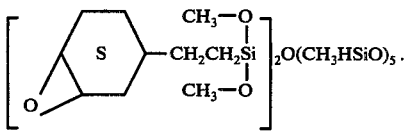

* * * * *

UNITED STATES PATENT AND TRADEMARK OFFICE
CERTIFICATE OF CORRECTION

PATENT NO. : 4,082,726
DATED : April 4, 1978
INVENTOR(S) : KATSUTOSHI MINE ET AL It is certified that error appears in the above-identified patent and that said Letters Patent are hereby corrected as shown below:

Column 5, first sentence, "A copolymer resin which has 52.2 mol% of $MeSiO_{1.5}$" should read --A copolymer resin which has 52.5 mol% of $MeSiO_{1.5}$--

Column 5, last formula, should read

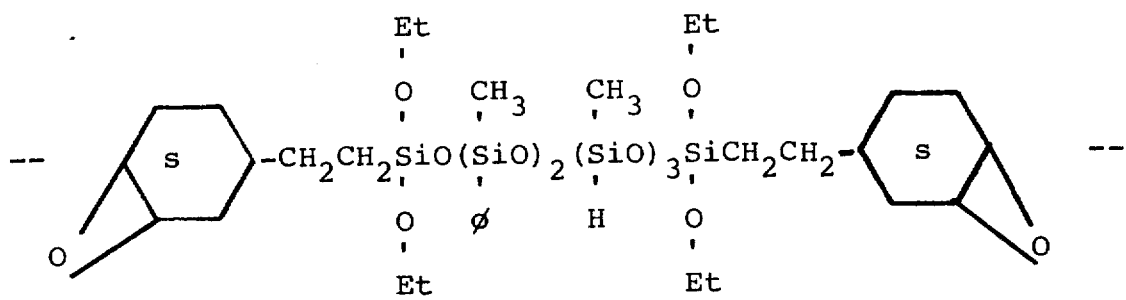

Signed and Sealed this

Eleventh Day of September 1979

[SEAL]

Attest:

LUTRELLE F. PARKER
Attesting Officer    Acting Commissioner of Patents and Trademarks